(12) United States Patent
Birnbaum et al.

(10) Patent No.: US 12,538,006 B2
(45) Date of Patent: Jan. 27, 2026

(54) CAMERA MODULES WITH MULTIPLE OPTICAL ASSEMBLIES

(71) Applicant: Apple Inc., Cupertino, CA (US)

(72) Inventors: Zachary W. Birnbaum, Santa Clara, CA (US); Andrew S. Jozefov, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 18/369,319

(22) Filed: Sep. 18, 2023

(65) Prior Publication Data

US 2025/0097556 A1    Mar. 20, 2025

(51) Int. Cl.
*H04N 23/45*  (2023.01)
*H04N 23/55*  (2023.01)
*H04N 23/90*  (2023.01)

(52) U.S. Cl.
CPC ............ *H04N 23/55* (2023.01); *H04N 23/90* (2023.01)

(58) Field of Classification Search
CPC ........ H04N 23/45; H04N 23/50; H04N 23/51; H04N 23/54; H04N 23/55; H04N 23/57; H04M 1/0264
USPC .......................................................... 348/374
See application file for complete search history.

(56) References Cited

U.S. PATENT DOCUMENTS

| | | | |
|---|---|---|---|
| 9,591,215 B1 | 3/2017 | Miller et al. | |
| 9,838,600 B1 | 12/2017 | Tam et al. | |
| 10,389,858 B2 | 8/2019 | Yu et al. | |
| 10,429,722 B2 | 10/2019 | Rho et al. | |
| 10,484,582 B2 | 11/2019 | Chen et al. | |
| 10,509,194 B2 | 12/2019 | Lee | |
| 10,573,776 B2 | 2/2020 | Jan et al. | |
| 11,023,994 B2 | 6/2021 | Lin et al. | |
| 11,272,082 B2 | 3/2022 | Miller et al. | |
| 11,297,237 B2 | 4/2022 | Park et al. | |
| 2014/0048997 A1 | 2/2014 | Cheng et al. | |
| 2017/0082823 A1* | 3/2017 | Hwang | H04N 23/75 |
| 2017/0146766 A1 | 5/2017 | Hsu | |
| 2018/0091716 A1* | 3/2018 | Brand | H04N 7/142 |
| 2018/0234529 A1* | 8/2018 | Yu | G02B 27/646 |
| 2021/0067675 A1* | 3/2021 | Yang | H04N 23/55 |
| 2022/0188092 A1 | 6/2022 | Liu et al. | |

FOREIGN PATENT DOCUMENTS

| | | | | |
|---|---|---|---|---|
| CN | 112822362 A | * | 5/2021 | ............. H04N 23/57 |
| CN | 107241473 B | * | 6/2023 | ............. H04N 23/57 |
| EP | 3606022 | | 6/2021 | |
| WO | WO 21/223830 | | 11/2021 | |
| WO | WO 22/179998 | | 9/2022 | |

* cited by examiner

*Primary Examiner* — Anthony J Daniels
(74) *Attorney, Agent, or Firm* — Brownstein Hyatt Farber Schreck, LLP

(57) ABSTRACT

A camera module may include a housing, a first optical assembly, a second optical assembly, a carrier, and an actuator. The first and second optical assemblies may be positioned within the camera module to receive light in opposite directions. The carrier may be positioned within the housing and include a first portion coupled to a first component of the first optical assembly and a second portion coupled to a second component of the second optical assembly. An actuator may be configured to simultaneously generate relative movement (i) between the first lens module and the first image sensor; and (ii) between the second lens module and the second image sensor.

20 Claims, 13 Drawing Sheets

CAMERA MODULES WITH MULTIPLE OPTICAL ASSEMBLIES

TECHNICAL FIELD

Embodiments described herein relate to camera modules for use in electronic devices. In particular, embodiments described herein relate to a camera module that includes optical assemblies facing opposite directions and the camera components associated therewith.

BACKGROUND

Cameras are important features of consumer electronics devices such as smartphones, tablets, virtual reality headsets, and computers. Generally, these consumer electronic devices may include multiple cameras facing the rear and facing the front of the device. However, space in an electronic device is limited and each of the camera modules, whether rear-facing or front-facing, take up space that may otherwise be utilized by different device components. Accordingly, it may be desirable to provide a camera module that can leverage shared camera components, thereby decreasing the space typically taken up by discretized camera modules.

SUMMARY

A camera module may include a housing, a first and a second optical assembly, a carrier, and an actuator. The first optical assembly may include a first lens module and a first image sensor positioned to receive light traveling through the first lens module along a first direction. A second optical assembly may include a second lens module and a second image sensor positioned to receive light traveling through the second lens module along a second direction opposite the first direction. The carrier may be positioned within the housing and include a first portion coupled to a first component of the first optical assembly and a second portion coupled a second component of the second optical assembly. The actuator may be configured to cause movement of the carrier in the first direction or in the second direction, thereby simultaneously generating relative movement between the first lens module and the first image sensor and between the second lens module and the second image sensor. The carrier may define a gap between the first portion and the second portion. The actuator may include a coil and a magnet positioned at least partially within the gap and between the first lens module and the second lens module.

In some cases, the first component may be a first lens module and the second component may be the second lens module. In some cases, the lens module is the first component, and the second image sensor is the second component.

The camera module describe herein may also include a holder at least partially surrounding a portion of the carrier and coupled to the second image sensor. The holder may define a first opening configured to receive a portion of the first lens module and a second opening at least partially positioned between the second lens module and the second image sensor. In some cases, the actuator comprises a set of ball bearings positioned between the holder and the carrier, and the actuator may be configured to move the carrier with respect to the holder. The camera module may include a position sensor configured to detect a position of the carrier within the camera module.

In some examples, the housing of the camera module has a first housing piece defining a first aperture. At least a portion of the first lens module may extend through the first aperture. The housing may further include a second housing piece that may be coupled to the first housing portion and may define a second aperture. At least a portion of the second lens module may extend through the second aperture.

According to some variations, a camera module may include a carrier. The carrier may have a first receptacle coupled to a first lens module of a first optical assembly and a second receptacle coupled to a second lens module of a second optical assembly. The first optical assembly may be configured to receive light in a first direction and the second optical assembly configured to receive light in a second direct opposite the first direction. The camera module may also have an actuator. The actuator may include a magnet coupled to the carrier and a coil configured to move the magnet along an axis in response to receiving an electrical current. The magnet and the coil may be positioned between the first optical assembly and the second optical assembly.

In some examples, the first optical assembly includes a first image sensor, and the second optical assembly includes a second image sensor. The magnet and the coil may be positioned between the first lens module and the second lens module. Additionally, the actuator may include a set of ball bearings positioned to contact the first receptacle and configured to guide movement of the carrier along the axis.

In some cases, the camera module may also have a holder. The holder can include a first portion defining an opening configured to receive a first lens module of the first optical assembly and a second portion positioned over the second receptacle. In some examples, the coil is coupled to the holder. The holder may additionally include a position sensor configured to detect a position of the carrier, the position sensor may be positioned between the first lens module and the second lens module.

The carrier of a camera module may include a connecting portion connecting the first receptacle to the second receptacle. The first receptacle may be separated from the second receptacle by a gap, and the magnet and the coil may be positioned at least partially within the air gap. In some cases, the first receptacle defines a first recess extending at least partially through the first receptacle and the magnet may be positioned at least partially within the recess. The coil may be coupled to a holder of the camera module that is positioned at least partially between the first receptacle and the second receptacle.

According to some embodiments, a camera module may have a first and second optical assemblies, a housing, a holder, and a carrier. The first optical assembly may include a first lens module and a first image sensor. The second optical assembly may include a second lens module and a second image sensor. The holder may be coupled to the housing and include a first holder portion having a top wall and a sidewall. The top wall may define a first opening through which the first lens module extends. A second holder portion may be coupled to the sidewall and to the second image sensor, and may positioned over the second lens module. The carrier may be coupled to the first lens module and to the second lens module and may be configured to move the first lens module and the second lens module along an axis relative to the holder.

Some variations of the camera module may also include an actuator having a magnet coupled to the carrier and a coil coupled to the sidewall of the holder and magnetically coupled to the magnet, the coil configured to move the magnet along the axis.

In some examples, the second holder portion defines a second opening. The second opening may be positioned at least partially between the second image sensor and the second lens module. The second opening may be positioned such that light passing from the second lens module to the second image sensor at least partially passes through the second opening. The holder may define a third opening positioned between the first lens module and the second lens module. to the third opening may at least partially receive a portion of an actuator that is configured to move the carrier relative to the holder.

In yet another example, the first holder portion defines a set of raceways, each of which is configured to receive a respective set of ball bearings. The first lens module may be positioned to receive light along a first direction and the second lens module may be positioned to receive light along a second direction opposite the first direction.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
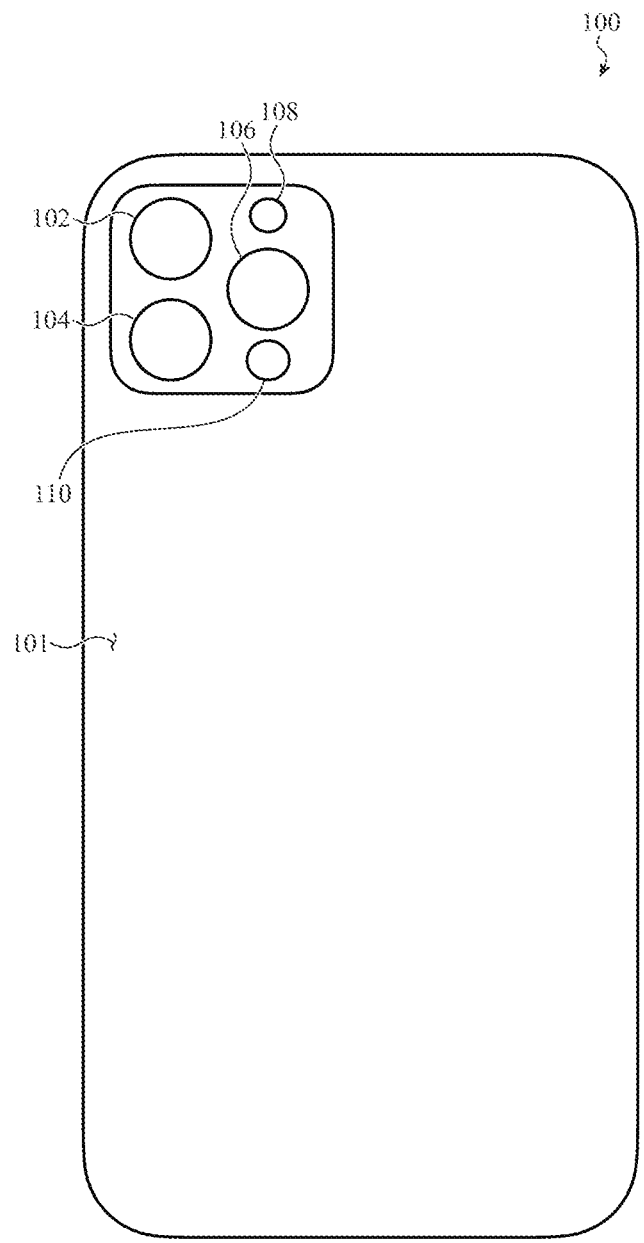
FIGS. 1A and 1B depict a rear view and a front view of an electronic device that may incorporate a camera module that includes optical assemblies facing opposite directions.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to camera module with multiple optical assemblies. The camera module can simultaneously move components from different optical assemblies to provide autofocus and/or image-stabilization capabilities. This movement changes a distance between a lens module and an image sensor of each respective optical assembly within the camera module. The simultaneous movement may be achieved by an actuator that moves corresponding components from each of the optical assemblies via a carrier. Using a single actuator to move components of multiple optical assemblies may reduce the overall size of the camera module compared to traditional, discretized cameras modules. As described herein, the optical assemblies face opposite directions (e.g., for rear-facing and a front-facing camera applications). The camera module may be mounted within an electronic device, such as phones, tablets, laptops, AR/VR headsets, laptops, watches, and so on.

The camera module may include a moveable carrier to which a component of each optical assembly is coupled. For example, a first component of a first optical assembly and a second component of a second optical assembly may be coupled to the carrier. The actuator is operable to move the carrier with respect to a housing of the camera module. In some variations, the actuator may include a magnet and a coil, and, when current is driven through the coil, causes the carrier to move along an axis. This movement causes the first component of the first optical assembly and the second component of the second optical assembly to move together simultaneously. This results in relative movement between components (e.g., lens module/image sensor pairs) within each optical assembly.

By having a common carrier and a common actuator, the space typically taken up by multiple cameras can be reduced. For example, separate camera modules (whether rear-facing or front-facing) use separate actuators to control focusing operations of these camera modules. A common actuator may take up less space as compared to multiple actuators, which may allow for larger component sizes within the optical assemblies (e.g., larger lenses and/or image sensors) for a given footprint, or may allow for a camera module with a smaller footprint, thereby allowing additional space for other electronic components of the device. Additionally, having a single actuator driving both optical assemblies reduces the likelihood of magnetic interference that may otherwise occur between two camera modules having different actuators.

In some examples, the camera module includes a holder that holds one or more components in a predetermined position as the carrier moves within the camera module. Accordingly, the carrier is moveable relative to the holder to provide relative movement between different components of each optical assembly. Certain portions may be configured to accommodate movement of the carrier (e.g., an opening through which a lens module carried by the carrier at least partially extends) and other portions may be configured to hold other components (e.g., an image sensor) in place relative to the carrier. In some cases, portions of the actuator, including the coil and a preload plate, are coupled to the holder. Additionally or alternatively, a position sensor may be coupled to or otherwise fixed relative to the holder. When the carrier moves, the position sensor can detect the relative position between the carrier (and any components coupled to the carrier) and the holder.

In some cases, the actuator may be positioned between portions of the carrier and/or between portions of the holder. More specifically, in some examples, one or more components of the actuator are coupled to a sidewall of the carrier and one or more components of the actuator are coupled to an opposing sidewall of the holder. In this position, the actuator may be positioned between both optical assemblies. This may facilitate movement of the carrier while reducing the overall footprint of the camera module. In some cases, the position sensor may to extend at least partially through the coil (e.g., through a center opening defined by the coil).

These foregoing and other embodiments are discussed below with reference to FIGS. 1A-4E. However, those skilled in the art will readily appreciate that the detailed description given herein with respect to these figures is for explanation only and should not be construed as limiting.

Figure 1B:
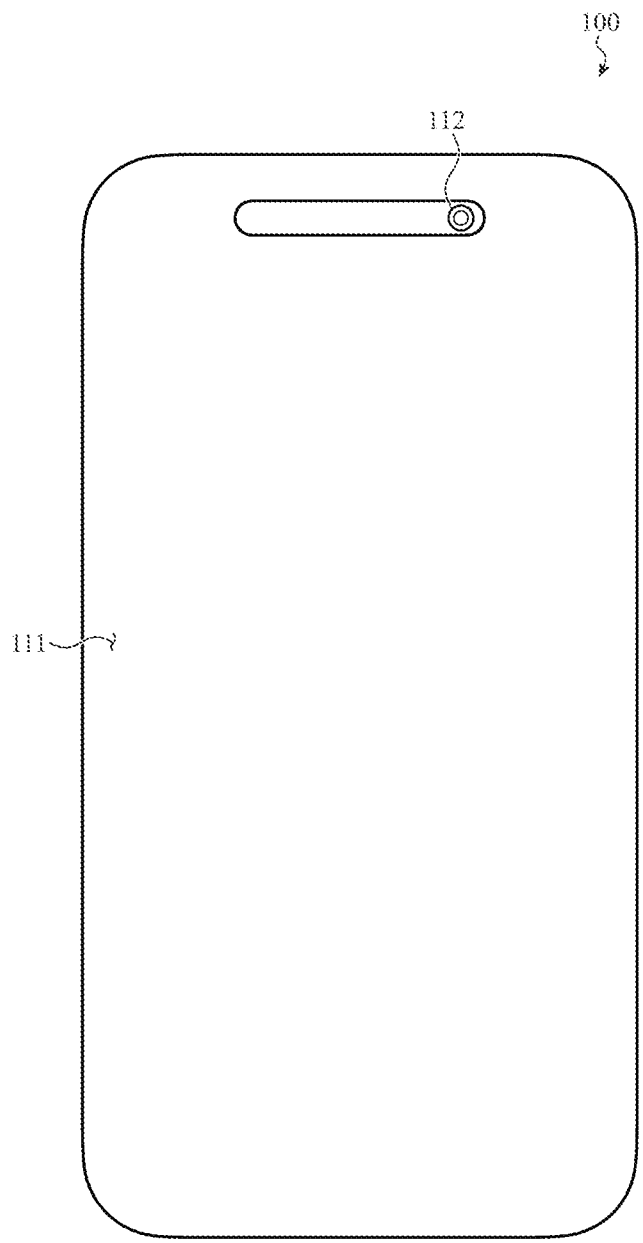

The camera modules described herein may be incorporated into an electronic device to provide opposite-facing cameras. These electronic devices may include a phone, tablet, virtual headset, watch, computer, or the like. FIGS. 1A and 1B depict an example device 100 into which a camera module having multiple optical assemblies can be incorporated. As shown in FIG. 1A, the device 100 may include a rear surface 101 that defines a region through with multiple rear-facing cameras may capture images.

In particular, the device 100 includes a camera 102, a second camera 104, and a camera 106. Each of these cameras 102-106 may have a corresponding set of optical properties (e.g., zoom level) and may be positioned at any suitable location within the device 100. These cameras 102-106 may have any suitable relative arrangement as may be desired. In some examples, the first camera 102, the second camera 104, and the third camera 106 may be positioned in a triangular arrangement, such that the cameras are centered on different vertices of a triangle (e.g., an isosceles triangle or an equilateral triangle). In some cases, the second camera 104 and the third camera 106 are configured as separate camera modules. In other examples, one or more of these cameras may be defined by an optical assembly of a camera module with multiple optical assemblies as described herein.

In some instances, the device 100 may include a flash module 108. The flash module 108 may provide illumination to some or all of the fields of view of the optical assemblies of the device. This may assist with image capture operations in low light settings. Additionally or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor 110 is capable of providing depth information). The field of coverage of the depth sensor 110 may at least partially overlap the field of view of one or more of the optical assemblies. The depth sensor 110 may be any suitable system that is capable of calculating the distance between the depth sensor 110 and various points in the environment around the device 100.

FIG. 1B depicts a front view of the device 100. The device 100 may include a front surface 111 that defines a region through which at least camera (e.g., a fourth camera 112) may capture images. In some cases, the first camera 102 and the fourth camera 112 may be defined by different optical assemblies of a single camera module. Specifically, the first camera 102 is formed by a first optical assembly and the fourth camera 112 is formed by a second optical assembly. While the first and second optical assemblies share a housing, the optical assemblies face in opposite directions (e.g., to receive light from the rear and from the front of the device, respectively). In this configuration, the first camera 102 and the fourth camera 112 may share components within the camera module, such as housing portions, actuators, flex circuits, or the like. By sharing camera components, the space and/or number of components typically used for each of the different cameras can be reduced. It should be appreciated that while the cameras are shown as positioned to receive light from a front or rear portion of the device and may be positioned over a top region of the device, other configurations and positions of the cameras are envisioned.

Figure 1C:
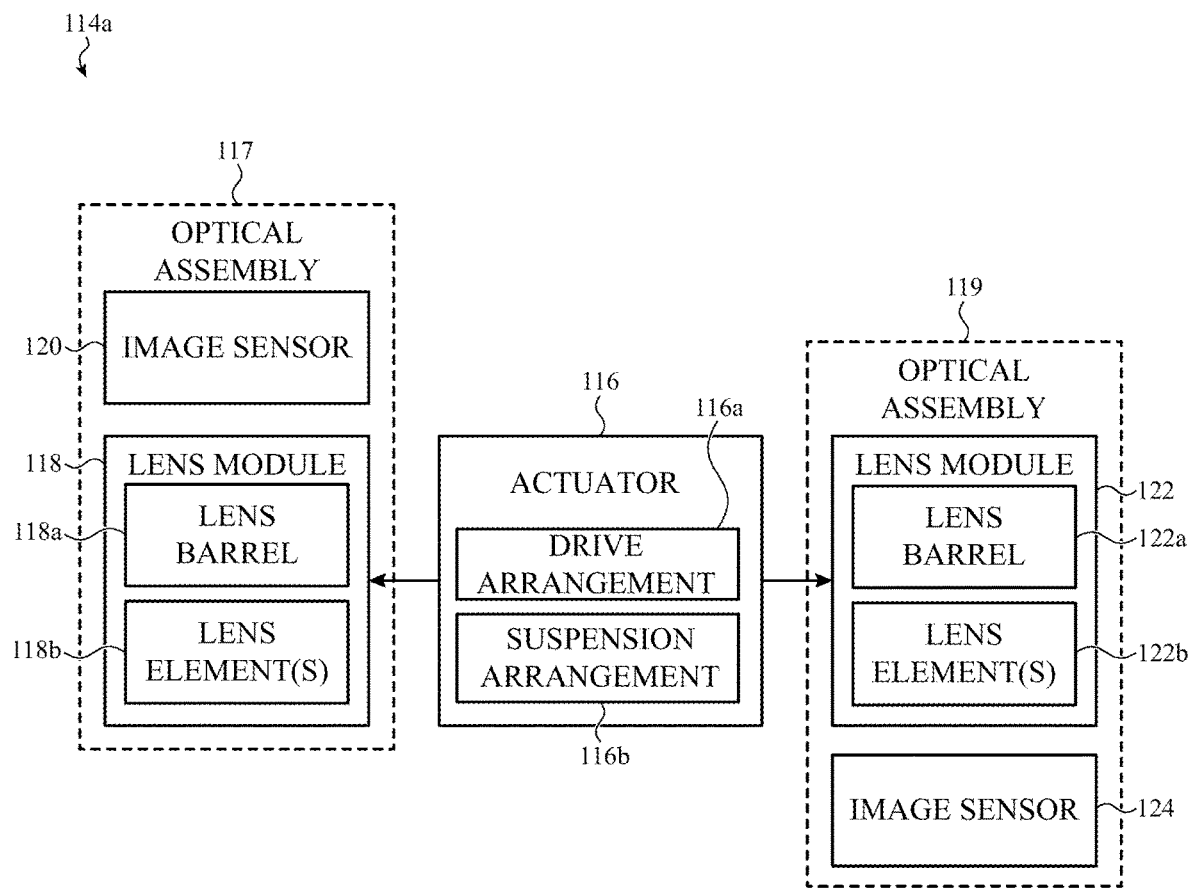
FIGS. 1C and 1D depict system diagrams of example camera modules, such as described herein.

FIG. 1C shows a system diagram of an example camera module 114a having optical assemblies that face opposite directions. Camera module 114a includes an actuator 116; a first optical assembly 117 that includes a first lens module 118 and a first image sensor 120; and a second optical assembly 119 that includes a second lens module 122 and a second image sensor 124. As depicted, the actuator 116 is configured to move the lens modules of both optical assemblies (e.g., the first lens module 118 and the second lens module 122) simultaneously. Accordingly, the first lens module 118 is moved by the actuator 116 relative to the first image sensor 120, and the second lens module 122 is simultaneously moved relative to the second image sensor 124. Depending on the direction(s) of the relative movement between each lens module and its corresponding image sensor, the actuator 116 may provide autofocus and/or image stabilization capabilities to the camera module.

The first and the second lens modules 118 and 122 may each include a lens barrel (e.g., lens barrels 118a and 122a) that houses and holds various optical elements (e.g., lens elements, aperture layers, filters, prisms, mirrors, or the like) of that lens module. For example, the first and second lens modules 118 and 122 each may include a set of one or more lens elements (e.g., lens elements 118b and 122b). The lens elements 118b and 122b, along with any other optical elements of the respective first and second lens modules 118 and 122, act to direct light to the first and second image sensors 120 and 124, respectively. The first and second image sensors 120 and 124 may be any suitable sensor such as CCD, CMOS sensor, or the like, and is configured to generate one or more signals that convey information about light received thereby.

The actuator 116 may include a drive arrangement 116a and a suspension arrangement 116b. Specifically, the drive arrangement 116a is configured to generate the forces needed to move the first lens module 118 and the second lens module 122 (e.g., via a shared carrier structure) within the camera module 114a. For example, when the first and second lens modules 118 and 122 are each fixed to a carrier as described in more detail herein, the drive arrangement 116a may provide a force to the carrier to move the carrier (and thereby move the lens modules 118 and 122) within the camera module 114a. The drive arrangement 116a may include a voice coil motor, a comb drive, a Shape Memory Alloy (SMA), or the like. In embodiments where the drive arrangement 116a includes a voice coil motor, the voice coil motor may have a magnet and a coil. The coil may be positioned within the magnetic field of the magnet such that when current is driven through the coil, a Lorentz force is generated that can create relative movement between the coil and magnet, which in turn may move the first and second lens modules 118 and 122 within the camera module 114a.

The suspension arrangement 116b may include one or more suspension elements that are configured to guide movement of one or more components moved by the drive arrangement 116a. For example, in some variations a suspension mechanism may include one or more flexures (e.g., leaf spring(s), suspension wire(s), flexure arms(s), or the like) and/or one or more bearings (e.g., a ball bearing(s), roller bearing(s), or the like). In instances where the suspension arrangement 116b comprises one or more flexures, the flexures may provide a moveable connection between a moving component and one or more additional structures in the camera module 114a. In instances where the suspension arrangement 116b comprises one or more bearings, the bearings may be positioned between a moving component and one or more additional structures in the camera, and may guide movement of that component. In instances where the first and second lens modules 118 and 122 are each fixed to a common carrier structure, the suspension arrangement 116b may be configured to guide movement of the carrier structure. In this way, the suspension arrangement 116b may be shared between the first and the second lens modules 118 and 122.

Figure 1D:
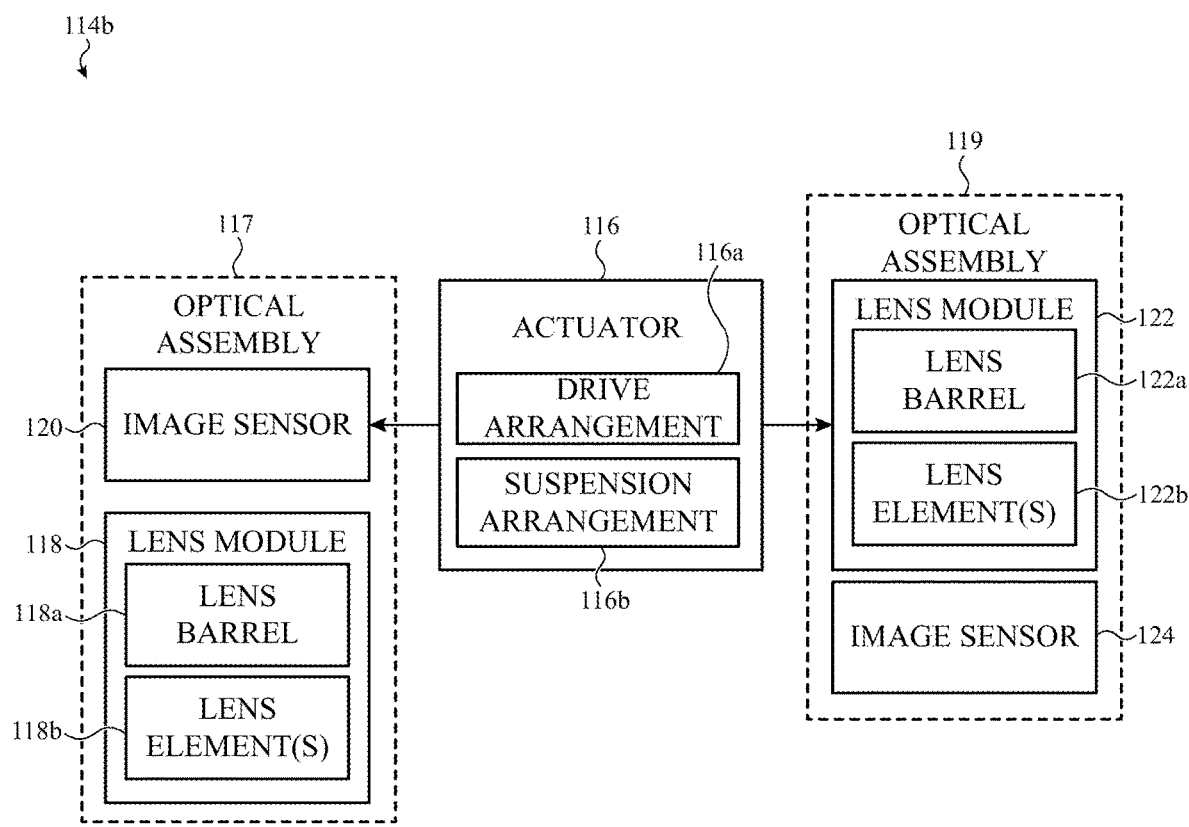

While FIG. 1C shows an actuator which is configured to move the first and second lens modules 118 and 122 relative to the first and second image sensors 120 and 124, in other embodiments the actuator may be instead configured to move one of the image sensors relative to its corresponding lens module. For example, FIG. 1D shows another example variation of a camera module 114b. The camera module 114b may be configured in any manner as described herein with respect to the camera module 114a of FIG. 1C, except that the actuator 116 is configured to move the first image sensor 120 relative to the first lens module 118. Accordingly, the actuator 116 is configured to simultaneously move the first image sensor 120 and the second lens module 122. In this configuration, within the first optical assembly 117, the first image sensor 120 is moved via the actuator 116 relative to the first lens module 118 (which may have a fixed position relative to a housing of a camera module 114b). Within the second optical assembly 119, the second lens module 122 is moved via the actuator 116 relative to the second image sensor 124 (which may have a fixed position relative to the housing of the camera module 114b).

In some instances, the actuator 116 may be configured such that there is an inverse relationship between a first distance separating the first image sensor 120 and the first lens module 118 and a second distance separating the second image sensor 124 and the second lens module 122. Using the camera module 114a of FIG. 1C as an example, the actuator 116 may be configured to move the first and second lens modules 118 and 122 along a direction parallel to the optical axis of each of the lens barrels. In these instances, as the actuator 116 moves the first lens module 118 closer to the first image sensor 120, the distance between the second lens module 122 and the second image sensor 124 will increase (and vice versa). Similar principles may be applied to the camera module 114b of FIG. 1D.

This movement may be used to adjust the focus of the first optical assembly 117 and the second optical assembly 119. Because the actuator moves components from each optical assembly simultaneously, operation of the actuator 116 may simultaneously adjust the focus of both optical assemblies. In some instances, the camera modules 114a and 114b may be operated such that only one optical assembly is used to captured images at a given time. In these instances, the actuator 116 may be operated to focus the optical assembly that is currently capturing images. In some instances it may be possible for the camera modules 114a and 114b to be operated such that both optical assemblies are simultaneously capturing images. In these instances, the actuator 116 may be operated in a manner that considers both optical assemblies.

More generally, in some embodiments, the device 100 is a portable multifunction electronic device, such as a mobile telephone, that also contains other functions, such as PDA and/or music player functions. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1E:
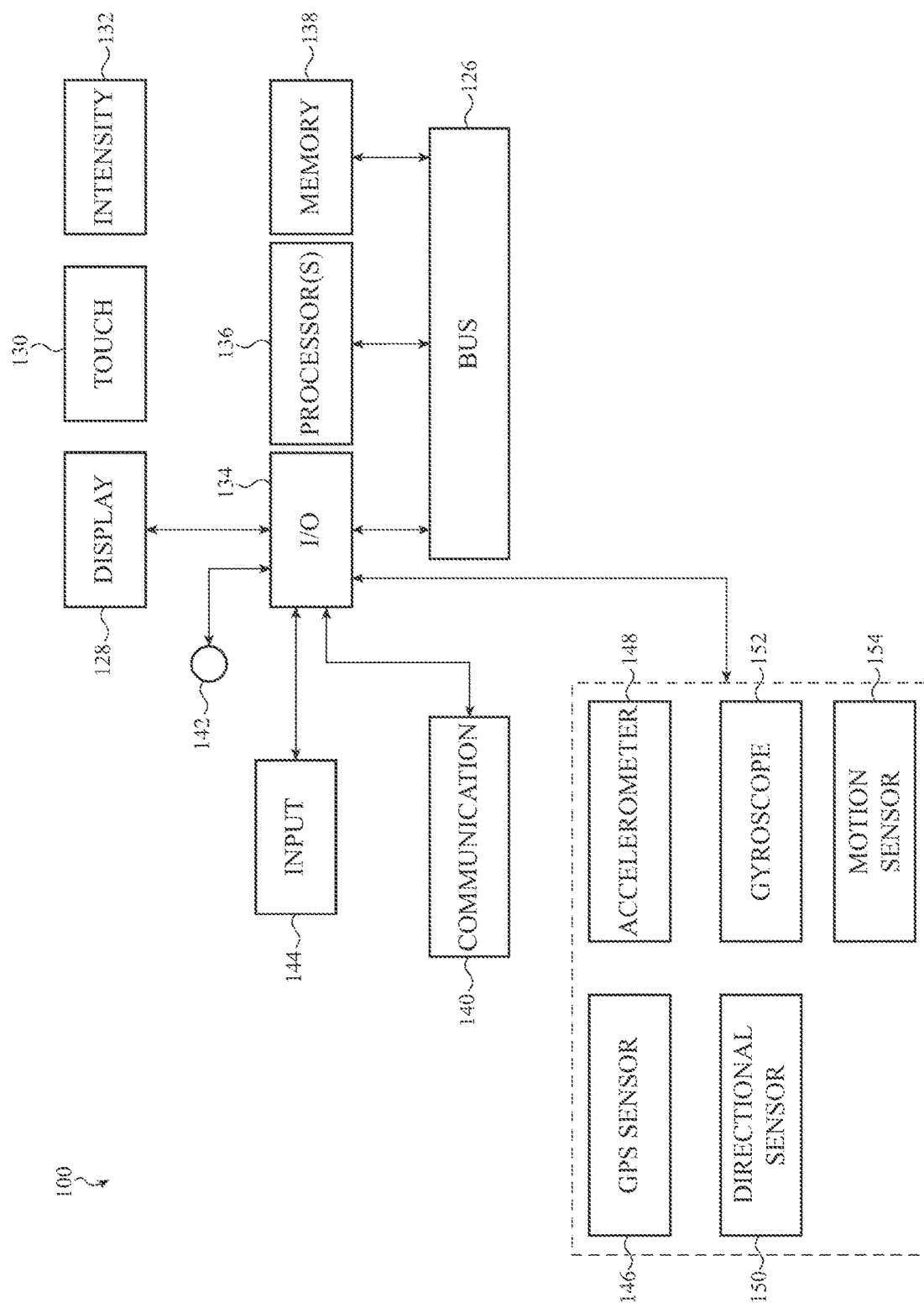
FIG. 1E depicts exemplary components of the device of FIGS. 1A and 1B.

FIG. 1E depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples. The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform the techniques that are described here (such as actuating the actuators described herein or otherwise operating the optical assemblies to capture images). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images as described herein. Device 100 is not limited to the components and configuration of FIG. 1B but can include other or additional components in multiple configurations.

The electronic device depicted in FIGS. 1A-1E and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Figure 2:
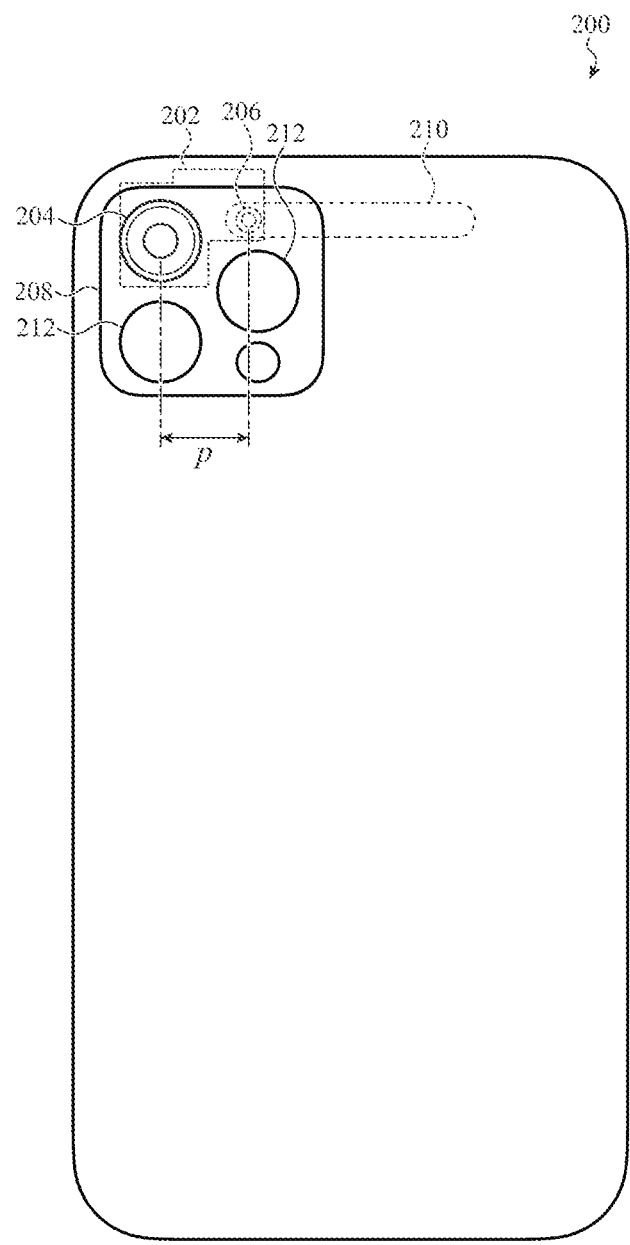
FIG. 2 depicts a rear view of an electronic device with a camera module that includes optical assemblies facing opposite directions.

As explained above, a camera module may include rear-facing and front-facing optical assemblies. By having more than one optical assembly within a camera module and by sharing camera components within that module, the space typically needed to fit two discrete camera modules in a device is reduced. FIG. 2 depicts a rear view of electronic device 200 with a camera module 202 which includes two optical assemblies facing opposite directions.

As depicted, an electronic device 200 may include a camera module 202 which houses a first optical assembly 204 and a second optical assembly 206. The first optical assembly 204 may be a rear-facing optical assembly including a lens module and an image sensor. The second optical assembly 206 may be front-facing optical assembly including a lens module and an image sensor. It should be appreciated that the components of the first optical assembly 204 may have any suitable size relative to corresponding components of the second optical assembly 206. For example, a lens module of second optical assembly 206 may have a smaller diameter than a lens module of the first optical assembly 204.

The camera module 202 may be shaped such that the first optical assembly 204 can be positioned within a first region 208 on the rear surface and such that the second optical assembly 206 is positioned within a second region 210 on the front surface. By incorporating the first optical assembly 204 and the second optical assembly 206 in a common module, the pitch P between the first and the second optical assemblies 204 and 206 can be reduced. This may provide flexibility in placing the first and second optical assemblies 204 and 206 within the electronic device 200. For example, it may be desirable for the first optical assembly 204 to be positioned at a particular point in region 208 on the rear surface of the electronic device 200, and for the second optical assembly 206 to be positioned at another point in region 210 of the front surface of the electronic device 200 (e.g., which may correspond to an opening in a display). If the first optical assembly 204 and the second optical assembly 206 were to be integrated into separate camera modules, it may not be possible to achieve this pitch P without sacrificing component size and/or displacing other cameras (such as additional cameras 212) of the electronic device. Additionally, incorporating the first optical assembly 204 and the second optical assembly 206 in a common module may also reduce the overall size of the camera module 202 as compared to two camera modules housing the first and second optical assemblies 204 and 206.

Figure 3A:
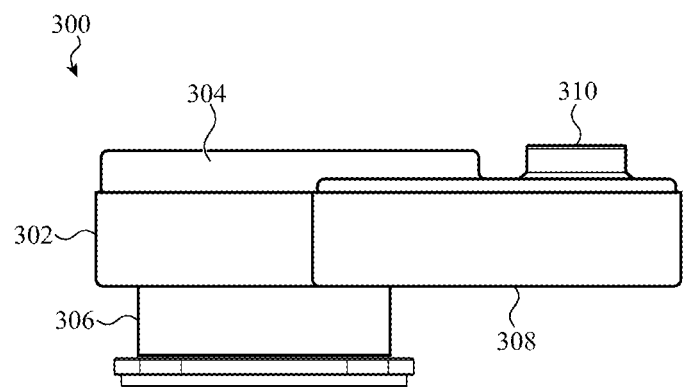
FIG. 3A-3C depict an elevation, a plan view, and a rear view of a camera module that includes optical assemblies facing opposite directions, such as described herein.
Figure 3B:
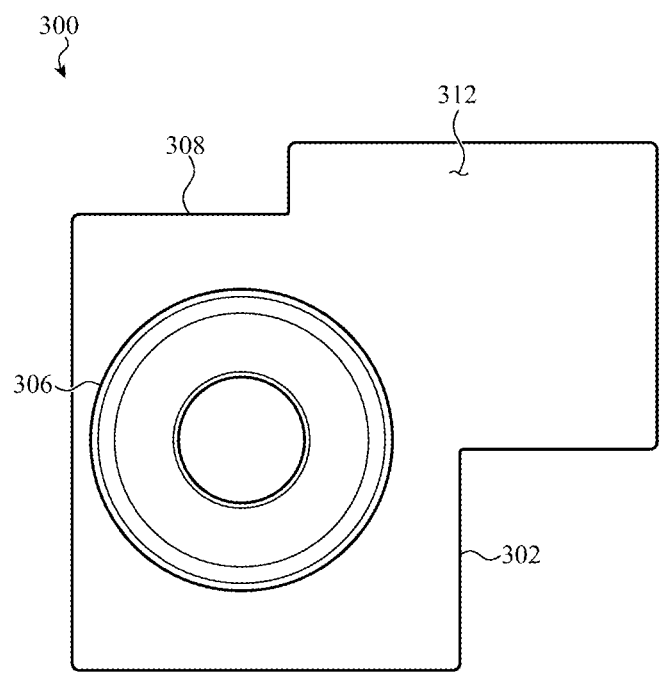
Figure 3C:
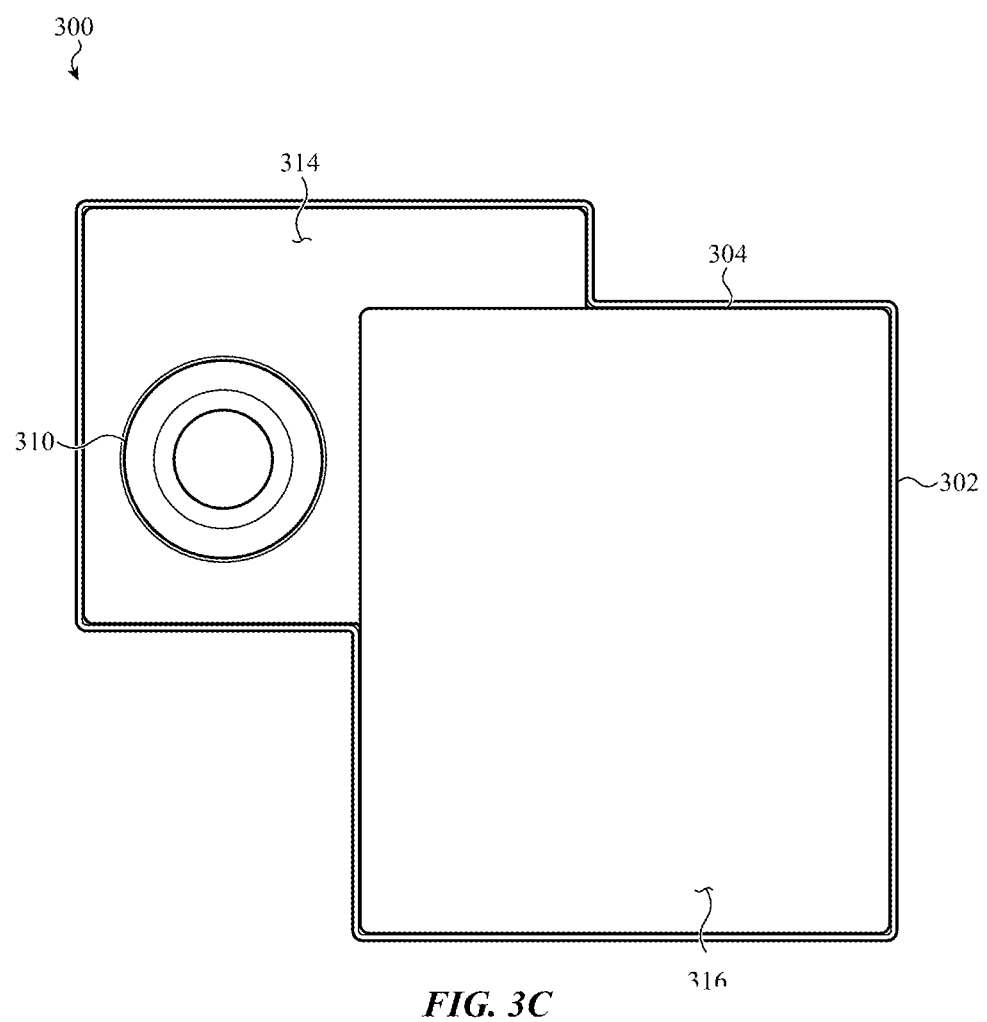

FIGS. 3A-3C depict elevation, back, and plan views, respectively, of a camera module 300 that includes multiple optical assemblies. The camera module 300 is an example of camera module 202 incorporated into electronic device 200. As depicted in FIG. 3A, the camera module 300 may include a housing 302. The housing 302 may at least partially enclose the optical assemblies, an actuator (not shown), and other camera components. The housing 302 may include a first housing portion 308 through which a portion of a first optical assembly 306 protrudes and a second housing portion 304 through which a portion of a second optical assembly 310 protrudes. The different housing portions 304 and 308 may have any suitable shapes as may be desired to accommodate optical assemblies and facilitate mounting of the camera module with the device.

For example, as shown in FIG. 3B, the first housing portion 308 defines a back surface 312 of the camera module 300, and further defines a first opening through which a lens module of the first optical assembly 306 protrudes. In some embodiments, the back surface 312 of the first housing portion 308 may be flat. Conversely, as depicted in FIG. 3C, the second housing portion 304 may define multiple stepped front surfaces of the camera module 300, including a first front surface 314 and a second front surface 316 having different surface heights. In the variation, the first front surface 314 is recessed relative to the second front surface 316 and may define a second opening through which a lens module of the second optical assembly 310 protrudes. It should be appreciated that the housing 302 may have other configurations depending on the relative size and positioning of the optical assemblies of the camera module 300.

As explained above, a camera module may include optical assemblies facing opposite directions. The camera module may leverage structures that are common to both optical assemblies in order to provide precise relative positioning and movement between components of the optical assemblies. For example, a holder may house a stationary component from each optical assembly, while a carrier may carry a moving component from each optical assembly. In this way, movement of the carrier relative holder will simultaneously move the moving component of each optical assembly relative to the corresponding stationary component of each optical assembly. Specifically, movement of the carrier causes relative movement between an image sensor and a lens module for each optical assembly.

FIG. 4A-4E show different views of an example camera module 400 having a first optical assembly 405 and a second optical assembly 409. The first optical assembly 405 includes a first lens module 406 and a first image sensor 450, and the second optical assembly 409 includes a second lens module 410 and a second image sensor 444. The camera module 400 includes a housing formed by a bottom housing portion 458 and top housing portion 460, as well as a carrier 402 and a holder 432 at least partially enclosed within the housing. The carrier 402 is moveable relative to the holder 432 to simultaneously provide relative movement between components of the first optical assembly 405 and relative movement between components of the second optical assembly 409. The camera module 400 further includes an actuator 413 configured to move the carrier 402 relative to the holder 432.

The carrier 402 may be any suitable structure that retains moving portions of both optical assemblies. In some variations, the carrier 402 includes a first receptacle 404 that holds the first lens module 406 of the first optical assembly 405 and a second receptacle 408 that holds the second lens module 410 of the second optical assembly 409. Each receptacle may define an opening through which a corresponding lens module at least partially extends. In this way, light entering the first optical assembly 405 may pass through an opening in the first receptacle 404 before reaching a first image sensor 450 of the first optical assembly 405. Similarly, light entering the second optical assembly 409 may pass through an opening in the second receptacle 408 before reaching a second image sensor 444 of the second optical assembly 409. The carrier may be formed as a monolithic piece, or may be formed from multiple pieces that are connected together.

Figure 4A:
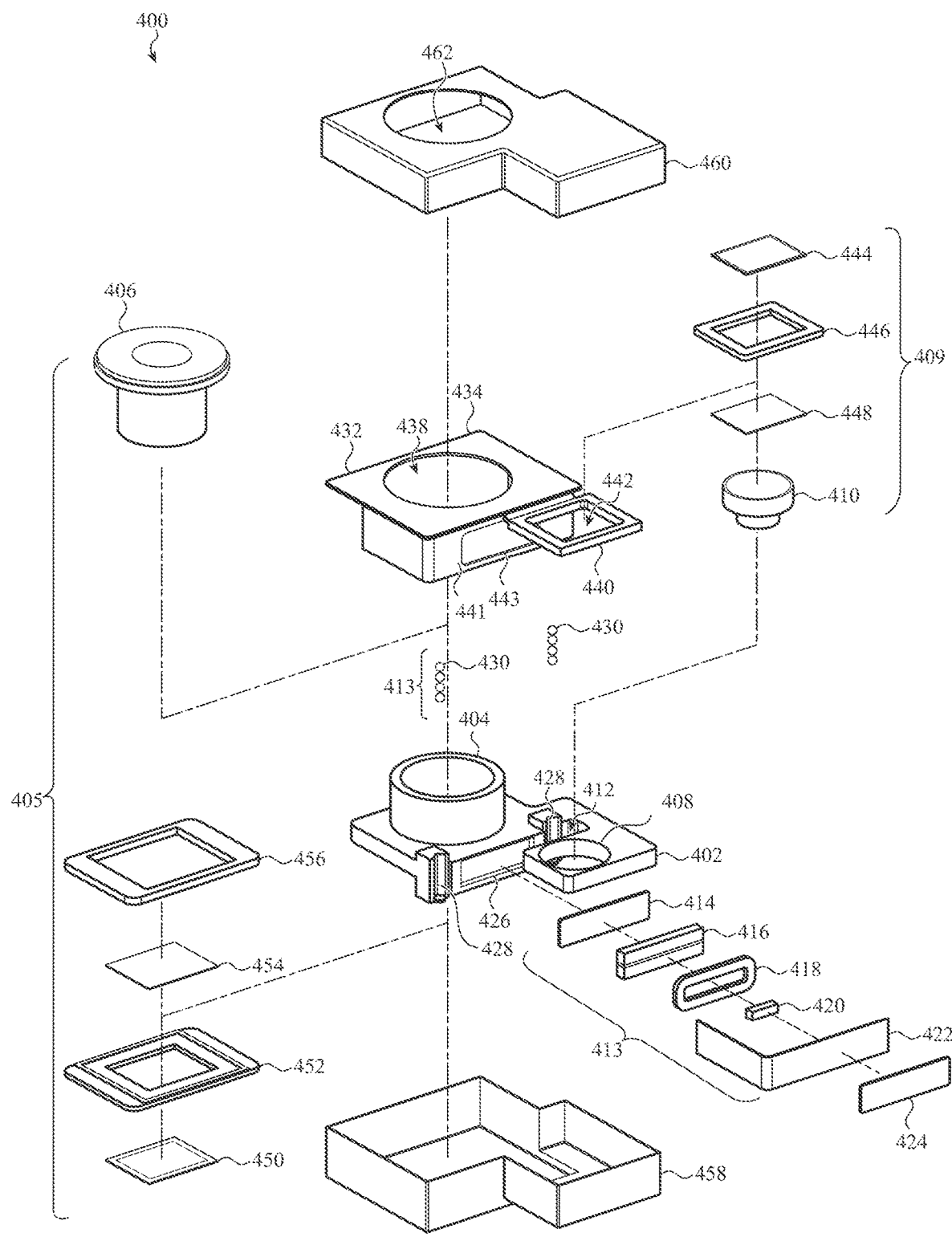
FIG. 4A depicts an exploded front perspective view of the camera module that includes optical assemblies facing opposite directions.

In the variation shown in FIG. 4A, the first optical assembly 405 and the second optical assembly 409 are configured to receive light from opposite directions. The carrier 402 may be configured to hold the first and second lens modules 406 and 410 such that the lens modules face opposite directions. Upon moving the carrier 402, the first lens module 406 and the second lens module 410 move simultaneously. In these instances, moving the carrier 402 in one direction may simultaneously move the first lens module 406 closer to the first image sensor 450 and move the second lens module 410 farther from the second image sensor 444. Moving the carrier 402 in an opposite direction may move the first lens module 406 farther from the first image sensor 450 and move the second lens module 410 closer to the second image sensor 444.

While the carrier 402 is shown in FIG. 4A as carrying the first and second lens modules 406 and 410, other configurations are envisioned. For example, in one variation, the carrier 402 includes one or more portions configured to hold an image sensor instead of a lens module for a given optical assembly (e.g., to hold the first image sensor 450 instead of the first lens module 406).

Figure 4B:
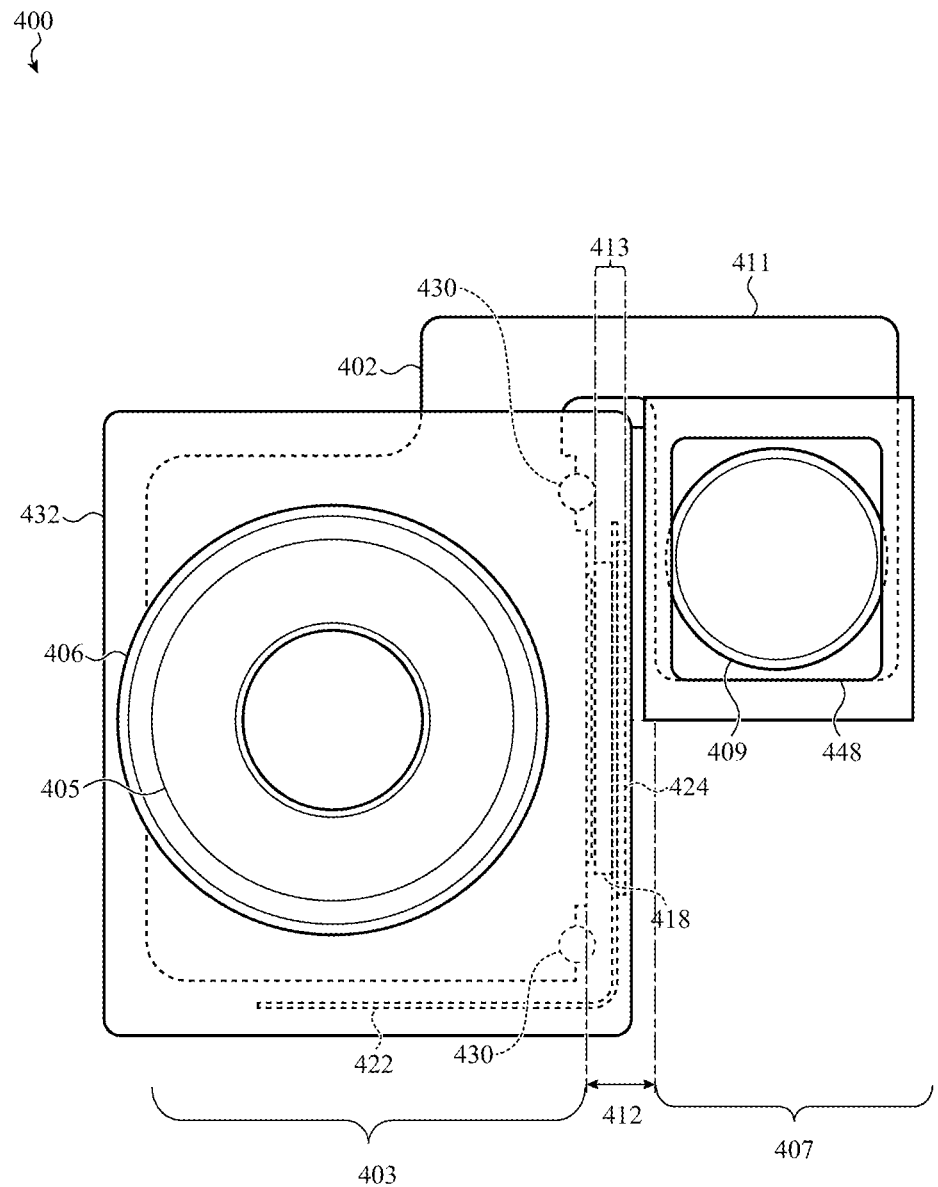
FIG. 4B depicts a plan view.

The carrier 402 may include a first portion 403 and a second portion 407, such as shown in FIG. 4B. The first portion 403 may be configured to hold a component of the first optical assembly 405 while the second portion 407 may be configured to hold a component of the second optical assembly 409. For example, the first portion 403 may include the first receptacle 404 for receiving and holding the first lens module 406 of the first optical assembly 405. As shown in the perspective view of FIG. 4C, the first lens module 406 may be positioned to extend at least partially through an opening defined by the receptacle 404. In one example, the lens module 406 may be positioned such that a rear surface 406a of the first lens module 406 may be coplanar with a bottom surface 402a of the carrier 402. In other variations, the rear surface 406a of the first lens module 406 may protrude from the bottom surface 402a or may be recessed relative to the bottom surface 402a. The dimensions and tolerances of the receptacle 404 and the opening may help with the alignment of the first lens module 406 with respect to the image sensor and/or with respect to the housing of the camera module 400. In some instances, the first lens module 406 may include adhesive bondlines that fix a relative position between the first lens module 406 and the carrier 402. This may facilitate alignment of the first lens module 406 relative to the carrier 402 (and thereby relative to other camera components) during assembly of the camera module.

Figure 4C:
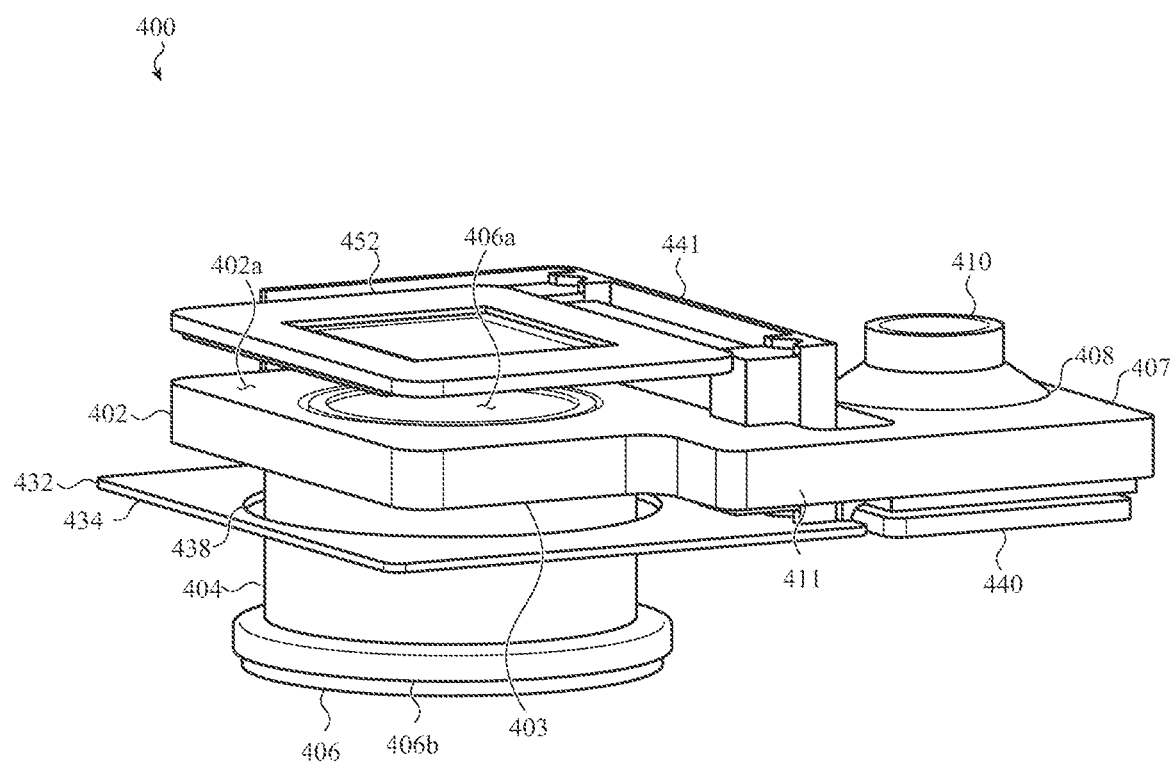
FIGS. 4C and 4D depict rear perspective views.
Figure 4D:
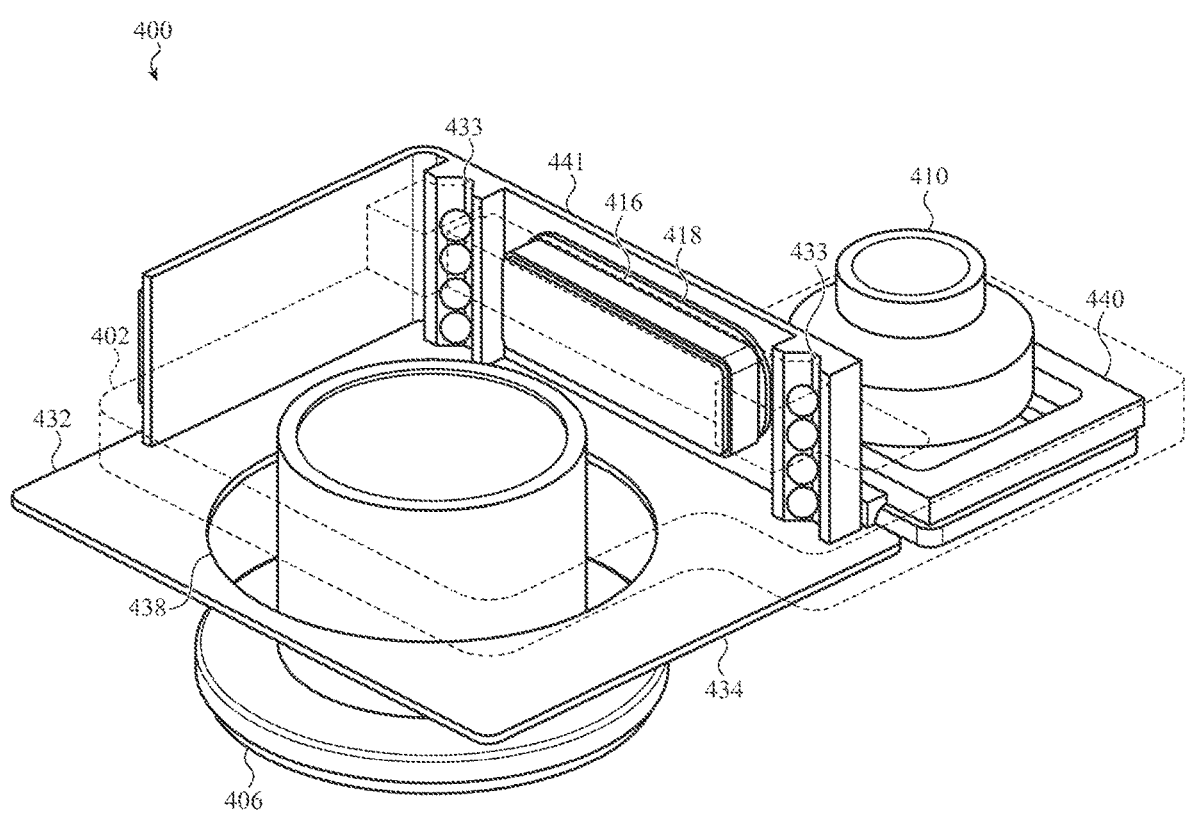
Figure 4E:
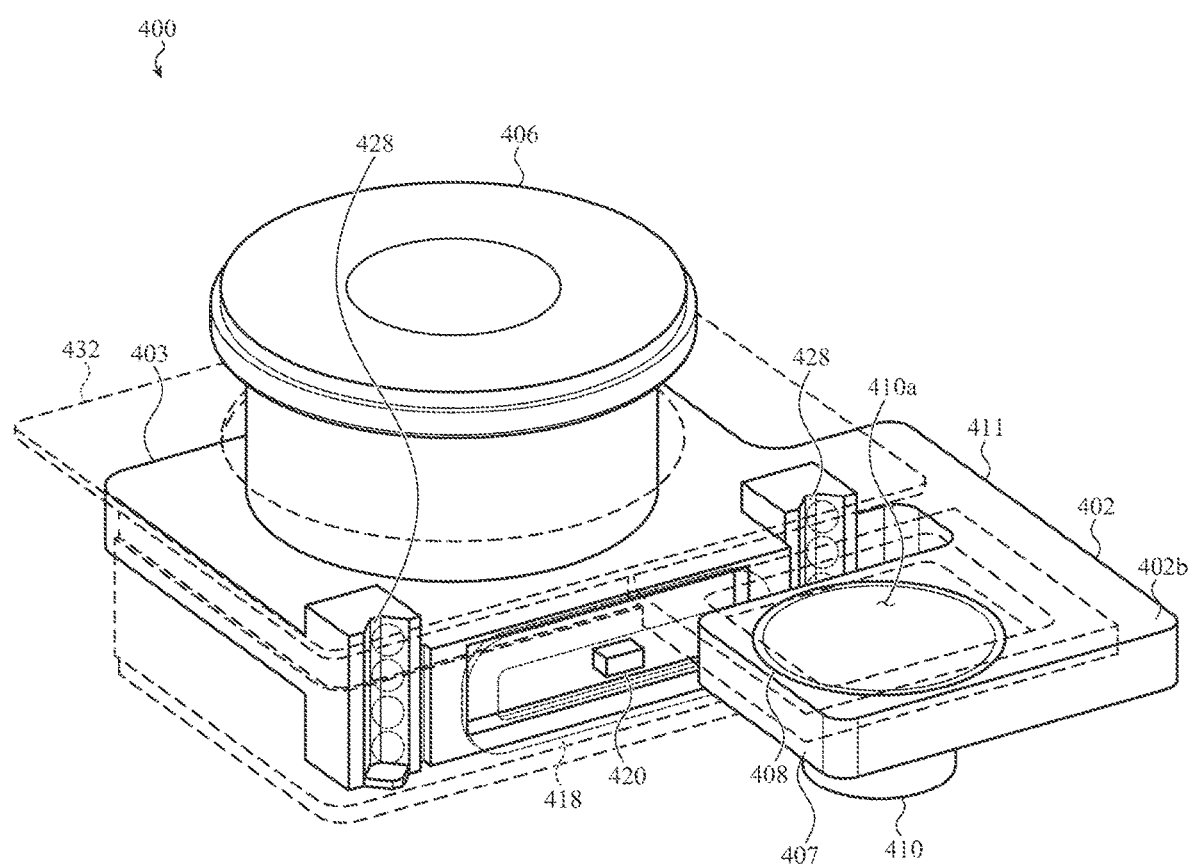
FIG. 4E depicts a front perspective view, respectively, of portions of the camera module of FIG. 4A.

Similarly, such shown in FIGS. 4A, 4B, and 4E, the second portion 407 may include the second receptacle 408 for receiving and holding the second lens module 410 of the second optical assembly 409. The second lens module 410 may be positioned to extend at least partially through an opening defined by the second receptacle 408. In some instances, such as shown in FIG. 4E, the second lens module 410 may be positioned such that a rear surface 410a of the second lens module 410 may be coplanar with a top surface 402b of the carrier 402. In other variations, the rear surface 410a of the second lens module 410 may protrude from the top surface 402b or may be recessed relative to the top surface 402b. The second lens module 410 may also have adhesive bondlines to help facilitate alignment of the second lens module 410 relative to the carrier 402. In some variations the carrier 402 defines a gap 412 between the first portion 403 and the second portion 407 of the carrier 402. For example, as depicted in FIG. 4B, the carrier 402 may include a connecting portion 411 that couples the first portion 403 to the second portion 407 and thereby defines the gap 412. In these instances, the gap 412 may be positioned between the first and the second receptacles 404 and 408, and thereby be positioned between the first and second lens modules 406 and 410.

The gap 412 may be sized to accommodate one or more other components of the camera module 400. In this way, one or more components (e.g., components of an actuator, or the like) of the camera module 400 may be positioned within or at least partially within the gap 412, such that these components may be at least partially positioned between the first and second lens modules 406 and 410. In some examples, a portion of the holder 432 may extend at least partially through the gap 412, such that a portion of the holder 432 is positioned between the first lens module 406 and the second lens module 410. Similarly, one or more components of the actuator 413 may be positioned at least partially in the gap 412 (and thus between the first lens module 406 and second lens module 410), such as shown in FIG. 4B.

In the variation shown in FIG. 4A-4E, the actuator 413 includes a magnet 416 and a coil 418. The magnet 416 may be attached to the carrier 402 and the coil 418 may be connected to another portion the camera module 400 (e.g., the holder 432), such that when current is driven through the coil 418, a Lorenz force may be generated between the magnet 416 and the coil 418. This Lorenz force may move the carrier 402 within the camera module 400 (e.g., relative to the holder 432) to move the first and second lens modules 406 and 410.

In some variations, the actuator 413 further includes a backing plate 414. The backing plate 414 may also be attached to the carrier 402 such that the magnet 416 is positioned between the backing plate 414 and the coil 418. The backing plate 414 may be formed from iron or another ferromagnetic material that acts to redirect the magnetic flux for the magnet 416 in a direction toward the coil 418. This may improve the strength of the Lorentz force generated between the coil 418 and the magnet 416. To accommodate the backing plate 414 and the coil 418, the carrier 402 may define a recess 426 into which these components may be mounted.

The actuator 413 may further include a flex circuit 422, which may be electrically coupled to the coil 418. The flex circuit 422 may carry power and/or signals to and from the actuator 413. For example, the flex circuit 422 may route current to the coil 418 to operate the actuator 413. The flex circuit 422 may take any suitable shape or have any number of planar segments or any number of bends to conform to the shape of the camera module 400 and to conform to other constraints. For example, the flex circuit 422 may wrap from the gap 412 and around the holder 432.

The actuator 413 may also include a position sensor 420, which may measure the relative position of the carrier 402 within the camera module 400. For example, the position sensor 420 may be configured to measure its relative position to the magnet 416. In these instances, the position sensor 420 may be configured to measure the magnetic field generated by the magnet 416, and may include a Hall sensor, a tunneling magnetoresistance (TMR) sensor, a giant magnetoresistance (GMR) sensor, an anisotropic magnetoresistance (AMR) sensor, or the like. The position sensor 420 may be coupled to a fixed portion of the camera module 400, such as the holder 432. For example, the position sensor 420 may be connected to the flex circuit 422 (which may route signals from the position sensor 420), and may be further positioned within an opening defined by the coil 418, such as shown in FIG. 4E. In some of these variations, the position sensor 420 may be positioned within an opening 443 defined in the holder 432. As the carrier 402 moves relative to the holder 432, the position sensor 420 may experience a different portion of the magnetic field generated by magnet 416, and may measure this change in field strength and/or direction. Accordingly, the relative position of the carrier 402 (and thereby the position of first lens module 406 and the second lens module 410) may be determined from measurements performed by the position sensor 420.

The actuator 413 may include one or more suspension elements configured to guide motion of the carrier 402 relative to the holder 432, such as described in more detail with respect to FIGS. 1C and 1D. For example, the actuator 413 may comprise a set of ball bearings 430 positioned between the carrier 402 and the holder 432. The carrier 402 and the holder 432 may each contact the ball bearings 430 as the carrier 402 moves relative to the holder 432. For example, the carrier 402 defines a first set of raceways 428 into which the ball bearings 430 may sit. Similarly, the holder 432 may define a second set of raceways 433 (such as shown in FIG. 4D) into which the ball bearings 430 may also sit. For example, as shown in FIG. 4D, the second set of raceways 433 may be defined in a sidewall 441 of the holder 432. In some instances, at least one of the second set of raceways 433 is defined in a portion of the sidewall 441 that is positioned in the gap 412, such that some or all of the ball bearings 430 are positioned between the first and second portions 403 and 407 of the carrier 402. Collectively, the first and second sets of raceways 428 and 433, along with the ball bearings 430 may facilitate movement of the carrier 402 with respect to the holder 432 along an axis while restricting movement of the carrier 402 with respect to the holder 432 in other directions.

In some variations, the actuator 413 may also include a preload plate 424. Magnetic preloading in the camera module 400 is intended to keep the carrier 402 and holder 432 in contact with the set of ball bearings 430 during operation of the camera module 400. In some embodiments, the preload plate 424 may be positioned within the magnetic field of the magnet 416 to form a preloading arrangement. The preload plate 424 may be formed from a ferritic material (e.g., steel). The preload plate 424 may provide a magnetic force that pulls the holder 432 and the carrier 402 into contact with the ball bearings 430, thereby providing magnetic preloading between the carrier 402 and the holder 432. While not depicted in FIG. 4A, the actuator 413 may include magnets that are used for magnetic preloading but not actuating movement, or vice versa. The preload plate 424 may be coupled to the holder 432. For example, the coil 418 may be positioned between the preload plate 424 and the magnet 416.

The holder 432 is configured to hold one or more components of the optical assemblies, such as the first image sensor 450 and the second image sensor 444. As the carrier 402 is moved relative to the holder 432, the first and second lens modules 406 and 410 may be simultaneously moved relative to the first image sensor 450 and the second image sensor 444. In some examples, the holder may be fixed with respect to the camera module 400 (e.g., fixed relative to the upper housing portion 460 or the lower housing portion 458), such that the first image sensor 450 and the second image sensor 444 are held at fixed positions within the camera module 400.

Different portions of the holder may be configured to accommodate different portions of the first and second optical assemblies 405 and 409. For example, the holder 432 may include a first portion 434 which has a first opening 438 that is sized such that a portion of the first lens module 406 may extend through the opening 438. When the first lens module 406 is attached to the carrier 402 in an assembled configuration, such as shown in FIG. 4C, the first lens module 406 is positioned to extend through the first opening 438 in the first portion 434 of the holder 432. As the carrier 402 is moved relative to the first portion 434 of the holder 432 (e.g., along a direction parallel to an optical axis of the first lens module 406), the first lens module 406 can move within the first opening 438.

In some instances, the first portion 434 forms a top wall of the holder 432, and the holder 432 further includes at least one sidewall 441 that extends from the first portion 434 (e.g., in a direction parallel to respective optical axes of the first lens module 406 and/or the second lens module 410). The sidewall 441 may act to hold the first image sensor 450 in a particular position relative to the holder 432.

For example, the first optical assembly 405 may include a first substrate 452 to which the first image sensor 450 is mounted. The first substrate 452 may route electrical signals to and/or provide mechanical support to the first image sensor 450. The first optical assembly 405 may further include a first infrared filter 454 that is positioned between the first lens module 406 and the first image sensor 450, such that light received by the first image sensor 450 first passes through the first infrared filter 454. The first image sensor 450, the first infrared filter 454 and the first substrate 452 may be mounted to a base structure 456 (e.g., using one or more adhesive bondlines on the first substrate 452).

When the camera module 400 is assembled, the base structure 456 is attached to or otherwise held in a fixed relationship to the holder 432. For example, the base structure 456 may be held in contact with a portion of the sidewall 411 to place the base structure 456 (and thereby the first image sensor 450) in a specific location and/or orientation relative to the holder 432. In some instances, the relative position between the substrate 452 and the base structure 456 may be adjusted during bonding between these components to provide to make minor adjustments to the relative placement of the first image sensor 450 relative to the holder 432. Accordingly, the ability to provide alignment adjustments to both the first image sensor 450 and the first lens module 406 may provide flexibility in assembling the camera module 400.

In some instances, the sidewall 441 of the holder 432 may be positioned to hold one or more components of actuator 413. For example, a portion of the sidewall 441 may be positioned within the gap 412, such that the sidewall 441 (and portions of the actuator 413 connected to the sidewall 441) is positioned between the first lens module 406 and the second lens module 410. In some variations, the coil 418, the position sensor 420, the flex circuit 422, and the preloading plate 424 may each be connected to the sidewall 441 of the holder. The sidewall 441 of holder 432 may define an opening 443 that extends through the sidewall 441. In these instances, the coil 418 may be positioned to extend at least partially through the opening 443, which may hold the coil 418 in a particular position in relation to the holder 432.

The holder 432 may also include a second portion 440 that may be connected to the first portion 434 and is configured to hold the second image sensor 444 in a fixed relationship to the holder 432. For example, the second portion 440 may define a second opening 442 that extends through the second portion 440. The second image sensor 444 may be mounted to the second portion 440 and positioned such that light received by the second image sensor 444 passes at least partially through the second opening 442. For example, the second optical assembly 409 may include a second substrate 446 to which the second image sensor 444 is mounted. The second substrate 446 may route electrical signals to and/or provide mechanical support to the second image sensor 444. The second substrate 446 may be connected to the second portion 440 (e.g., via one or more adhesive bondlines) to mount second image sensor 444 to the holder 432. In some variations, the second optical assembly 409 may further include a second infrared filter 448 that is positioned between the second lens module 410 and the second image sensor 444, such that light received by the second image sensor 444 first passes through the second infrared filter 448.

When the camera module is assembled, the second portion 440 of the holder 432 may be positioned over the second portion 407 of the carrier 402, thereby allowing the second image sensor 444 to receive light from the second lens module 410. Similarly, the base structure 456 may be positioned under the first portion 403 of the carrier 402, such that the first image sensor 450 may receive light from the first lens module 406. In this way, the relative positioning between the carrier 402 and the holder 432 may determine the relative positions between the components of the first and second optical assemblies 405 and 409.

As described above with respect to the camera module 300 of FIGS. 3A and 3B, the housing may be sized and shaped in any manner as may be desired to accommodate the components of the camera module 400. For example, the top housing portion 460 may define an opening 462 through which a portion of the first lens module 406 may extend, and the bottom housing portion 458 may define another opening (not shown) through which a portion of the second lens module 410 may extend. Additionally, these housing portions may be shaped such that the holder 432 and/or base structure 456 engage one or more housing surfaces to help position these components within the housing.

In some configurations, the first and second lens modules 406 and 410 may have sufficiently large fields of view such that the first and second optical assemblies 405 and 409 may be operated simultaneously to capture omnidirectional images (e.g., images having a 360° or near −360° degree field of view). In some of these variations, the carrier 402 may be moved to a predetermined position or otherwise be moved to facilitate simultaneous image capture using the first and second optical assemblies 405 and 409. When capturing these omnidirectional images, it may be desirable to precisely align the first optical assembly 405 relative to the second optical assemblies 405 and 409. Accordingly, the carrier 402 and holder 432 may align the components of the first and second optical assemblies 405 and 409 within a single camera module 400, and thus these optical assemblies 405 and 409 may be precisely aligned relative to each other without needing to rely on the relative placement (and associated tolerances) between different camera modules.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A camera module comprising:
   a housing;
   a first optical assembly comprising:
      a first lens module; and
      a first image sensor, wherein the first image sensor is positioned to receive light traveling through the first lens module along a first direction;
   a second optical assembly comprising:
      a second lens module; and
      a second image sensor, wherein the second image sensor is positioned to receive light traveling through the second lens module along a second direction opposite the first direction;
   a carrier positioned within the housing, the carrier comprising:
      a first portion coupled to a first component of the first optical assembly; and a second portion coupled a second component of the second optical assembly; and an actuator configured to:
cause movement of the carrier in the first direction or in the second direction, thereby simultaneously generating relative movement between the first lens module and the first image sensor and between the second lens module and the second image sensor.

2. The camera module of claim 1, wherein:
the first component is the first lens module;
the second component is the second lens module;
the carrier defines a gap between the first portion and the second portion; and
the actuator comprises a coil and a magnet positioned at least partially within the gap and between the first lens module and the second lens module.

3. The camera module of claim 1, further comprising:
a holder at least partially surrounding a portion of the carrier and coupled to the second image sensor, the holder defining:
a first opening configured to receive a portion of the first lens module; and
a second opening at least partially positioned between the second lens module and the second image sensor.

4. The camera module of claim 3, wherein:
the actuator comprises a set of ball bearings positioned between the holder and the carrier; and
the actuator is configured to move the carrier with respect to the holder.

5. The camera module of claim 1, further comprising:
a position sensor configured to detect a position of the carrier.

6. The camera module of claim 1, wherein:
the housing comprises:
a first housing piece defining a first aperture, at least a portion of the first lens module extending through the first aperture; and
a second housing piece coupled to the first housing portion and defining a second aperture, at least a portion of the second lens module extending through the second aperture.

7. The camera module of claim 1, wherein:
the lens module is the first component; and
the second image sensor is the second component.

8. A camera module comprising:
a carrier comprising:
a first receptacle coupled to a first lens module of a first optical assembly, the first optical assembly configured to receive light in a first direction;
a second receptacle coupled to a second lens module of a second optical assembly, the second optical assembly configured to receive light in a second direction opposite the first direction; and
an actuator comprising:
a magnet coupled to the carrier; and
a coil configured to move the magnet along an axis in response to receiving an electrical current, wherein:
the magnet and the coil are positioned between the first optical assembly and the second optical assembly.

9. The camera module of claim 8, wherein:
the first optical assembly comprises a first image sensor;
the second optical assembly comprises a second image sensor; and
the magnet and the coil are positioned between the first lens module and the second lens module.

10. The camera module of claim 8, wherein:
the actuator comprises:
a set of ball bearings positioned to contact the first receptacle and configured to guide movement of the carrier along the axis.

11. The camera module of claim 10, further comprising:
a holder comprising:
a first portion defining an opening configured to receive the first lens module of the first optical assembly; and
a second portion positioned over the second receptacle;
wherein:
the coil is coupled to the holder.

12. The camera module of claim 8, further comprising:
a position sensor configured to detect a position of the carrier, the position sensor positioned between the first lens module and the second lens module.

13. The camera module of claim 8, wherein:
the carrier includes a connecting portion connecting the first receptacle to the second receptacle;
the first receptacle is separated from the second receptacle by an air gap; and
the magnet and the coil are positioned at least partially within the air gap.

14. The camera module of claim 8, wherein:
the first receptacle defines a first recess extending at least partially through the first receptacle;
the magnet is positioned at least partially within the recess; and
the coil is coupled to a holder of the camera module that is positioned at least partially between the first receptacle and the second receptacle.

15. A camera module comprising:
a first optical assembly comprising a first lens module and a first image sensor;
a second optical assembly comprising a second lens module and a second image sensor;
a housing;
a holder coupled to the housing, the holder comprising:
a first holder portion comprising a top wall and a sidewall, the top wall defining a first opening through which the first lens module extends;
a second holder portion coupled to the sidewall and to the second image sensor and positioned over the second lens module; and
a carrier coupled to the first lens module and to the second lens module, the carrier configured to move along an axis relative to the holder.

16. The camera module of claim 15, further comprising:
an actuator comprising:
a magnet coupled to the carrier; and
a coil coupled to the sidewall of the holder and magnetically coupled to the magnet, the coil configured to move the magnet along the axis.

17. The camera module of claim 15, wherein:
the second holder portion defines a second opening, the second opening is positioned at least partially between the second image sensor and the second lens module, the second opening is configured to at least partially transmit light received from the second lens module to the second image sensor.

18. The camera module of claim 17, wherein:
the holder defines a third opening positioned between the first lens module and the second lens module and configured to at least partially receive a portion of an actuator that is configured to move the carrier relative to the holder.

19. The camera module of claim 15, wherein:
the first holder portion defines a set of raceways, each of which is configured to receive a respective set of ball bearings.

20. The camera module of claim 15, wherein:
the first lens module is positioned to receive light along a first direction; and
the second lens module is positioned to receive light along a second direction opposite the first direction.

\* \* \* \* \*